A. S. HANGER.
SPRAYING APPARATUS.
APPLICATION FILED JULY 21, 1914.

1,161,386.

Patented Nov. 23, 1915.

Witnesses

A. S. Hanger
Inventor
Attorneys

UNITED STATES PATENT OFFICE.

ANDREW SANFORD HANGER, OF FISHERSVILLE, VIRGINIA.

SPRAYING APPARATUS.

1,161,386. Specification of Letters Patent. Patented Nov. 23, 1915.

Application filed July 21, 1914. Serial No. 852,279.

*To all whom it may concern:*

Be it known that I, ANDREW SANFORD HANGER, a citizen of the United States, residing at Fishersville, in the county of Augusta and State of Virginia, have invented a new and useful Spraying Apparatus, of which the following is a specification.

The present invention appertains to a spraying apparatus, and aims to provide a novel and improved apparatus for spraying fruit trees, and other vegetation.

The present invention contemplates the provision of an insecticide tank adapted to contain an insecticide solution and having a lower outlet, in combination with a piston movable within the said tank and forming an auxiliary or supplemental tank adapted to contain a supply of insecticide which may be let into the main tank after the main tank has been emptied, so that the reserve supply of insecticide will weight the piston for the intended purpose and without the presence of excessive dead weight.

It is also within the scope of the present invention to provide a spraying apparatus of the nature indicated which will be improved generally in construction, to enhance the utility thereof, and to render the construction comparatively simple and inexpensive, as well as convenient, practical and efficient in its use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in the accompanying drawing, wherein:—

Figure 1:
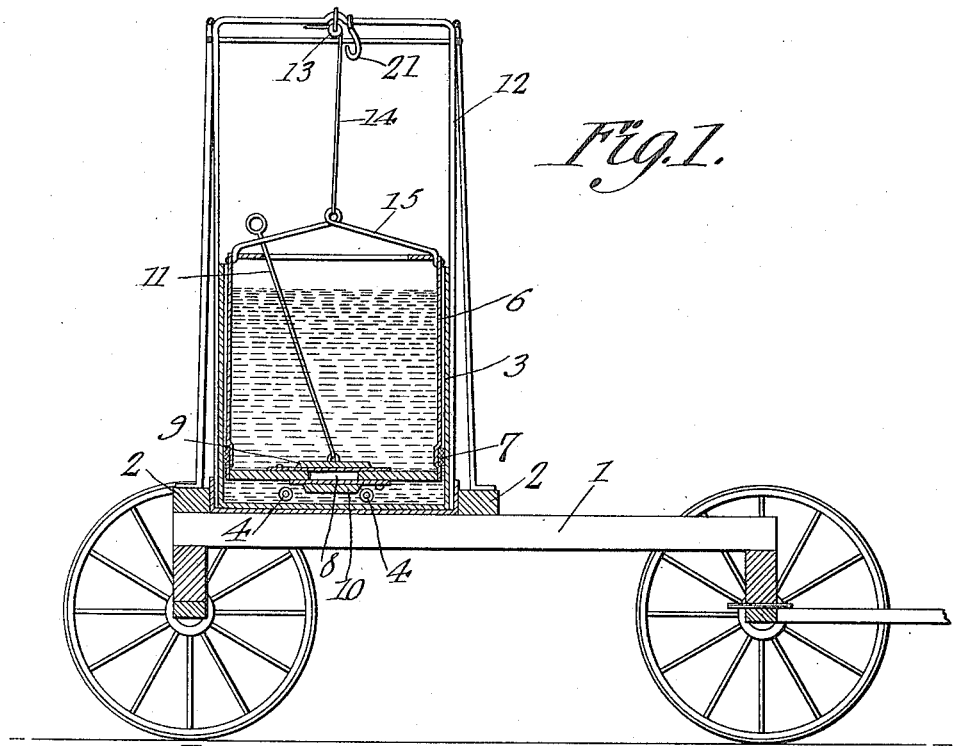
Figure 2:
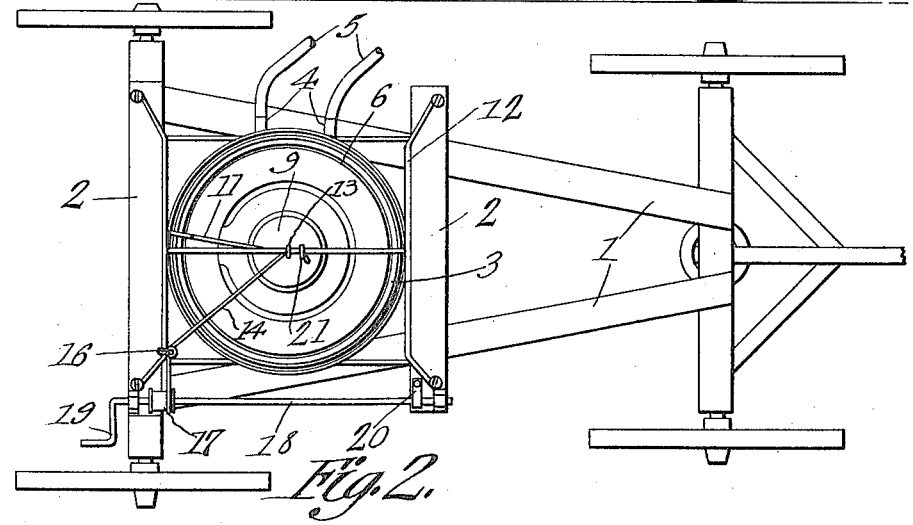

Figure 1 is a sectional view of the apparatus. Fig. 2 is a plan view thereof.

In carrying out the present invention, the spraying apparatus is preferably mounted upon a suitable vehicle or truck, which includes a wheel mounted frame having the longitudinal beams 1, and the cross bars 2 secured thereon.

Mounted upon the beams 1 of the frame between the cross bars 2, is the main tank 3, which is provided with lower outlets 4 having the hose 5 attached thereto. The hose 5 may be of any suitable lengths and are provided at their free ends with suitable nozzles (not shown). As will be obvious, the hose 5 are employed for discharging the insecticide from the tank 3 upon the trees or other vegetation in the usual manner.

One of the salient or cardinal features of the present invention is the provision of a piston for main tank 3, which is in the form of a supplemental or secondary tank 6 telescoped into the main tank 3, and provided with an annular packing 7 adjacent its bottom which fits snugly within the tank 3 to provide a liquid tight joint. The supplemental tank 6 is adapted to reciprocate or move vertically within the tank 3 in the manner of a piston.

The supplemental tank 6 is provided with means for enabling its contents to be discharged into main tank 3, and to this end, the bottom of the supplemental tank 6 is provided with an opening or passage 8, which is normally closed by upper and lower flap or check valves 9 and 10, respectively. The upper valve 9 is carried by the upper surface of the bottom of the tank 6 and seats downwardly over the opening 8 for normally preventing the contents of the tank from flowing downwardly through the opening 8 into the main tank 3, while the valve 10 is secured to the lower surface of the bottom of the tank 6 and seats upwardly against the bottom of the said tank to prevent the contents of the main tank 3 from flowing through the opening 8 into the tank 6.

A lift rod 11 is loosely connected to the upper check valve 9, and projects upwardly out of the tank 6 to be readily manipulated to unseat or open the valve 9 when necessary.

To enable the tank 3 to be elevated, there is provided a frame 12 upstanding from the frame or body of the vehicle and overhanging the tanks 3 and 6.

A pulley 13 is hung from the upper or crest portion of the frame 12 and has a cable 14 trained thereover, one end of the cable 14 being attached to a bail 15 connected to the upper end of the supplemental tank 6. The cable 14 is trained over a second pulley 16 carried by the upper end of the frame 12 at one side thereof, and the other end of the cable is secured to and adapted to be wound upon a drum or spool 17 which is secured upon the shaft 18 journaled upon the ends of the cross bars 2. The shaft 18 is provided with a hand crank 19 at one end, and the leaf spring 20 is secured upon one cross bar 2 and bears upon the shaft 18 to frictionally hold the same.

A hook 21 is hung from the upper end of the frame 12 to engage the bail 15 when the supplemental tank 6 is elevated, to thereby hold the supplemental tank in raised position during the filling of the tanks, and when the apparatus is out of operation.

In operation, to fill the tanks 3 and 6, the supplemental tank 6 is first elevated by winding the cable 14 upon the drum 17, as may be readily accomplished by properly rotating the crank 19. The hook 21 is then engaged with the bail 15 of the tank 6 which will hold the said tank in elevated position. The tank 6 is then filled with the insecticide, and the valve 9 is swung upwardly to open position by raising the lift rod 11, which will enable the insecticide to flow downwardly through the opening 8 in the bottom of the tank 6 into the tank 3 to fill the same, the lower valve 10 being forced open by the downward pressure of the insecticide as it flows through the opening 8. Then, when the tank 3 is filled, the lift rod 11 is released and the valve 9 will seat over the opening 8, in which event the supplemental tank 6 is filled with a reserve or additional supply of insecticide, which serves to weight the piston formed by the supplemental tank 6, without excessive dead weight. Then, when the hook 21 is released from the bail 15 of the supplemental tank, the supplemental tank will tend to telescope or move into the main tank 3, thereby placing the insecticide within the main tank 3 under pressure, so that it will be forcibly discharged through the hose 5 when permitted to do so. Due to the fact that the supplemental tank 6 is filled with the reserve supply of insecticide, the weight of the supplemental tank and its contents will create a considerable pressure upon the contents of the main tank 3, to properly eject the insecticide from the main tank 3 to permit the same to be sprayed on fruit trees and other vegetation in an effective manner. The weight of the supplemental tank 6 and its contents may be counteracted by means of the spring 20 which bears upon the shaft 18, to thereby retard the unwinding of the cable 14 from the drum 17. Thus, by adjusting the spring 20, the downward pressure of the supplemental tank may be regulated as desired, and by releasing the spring 20 from the shaft 18, the full benefit of the weight of the tank 6 and its contents will be utilized to the end noted.

During the operation of the apparatus, it will be observed that the upper valve 9 seating upon the bottom of the tank 6 over the opening 8, will prevent the contents of the tank 6 from flowing downwardly into the tank 3, while the lower valve 10 will prevent the contents of the tank 3 from flowing into the supplemental tank 6, as would destroy the function of the supplemental tank 6 which telescopes into the main tank 3 to define the pressure piston.

After the tank 3 has been emptied, the valve 9 may be opened to permit the contents of the tank 6 to flow into the tank 3, and the tank 6 may then be raised in the manner indicated, so that both tanks may be filled as above described.

It is to be noted that the supplemental tank is adapted to rise the greater portion of its length above the main tank when the supplemental tank is raised. The two tanks are therefore not of excessive dimensions, and when they are telescoped together provide a compact arrangement.

Having thus described the invention, what is claimed as new is:—

In a device of the character described, a main tank having a lower outlet, a supplemental tank telescoped into the main tank to provide a pressure piston, the bottom of the supplemental tank having an opening, downwardly and upwardly seating check valves carried by the bottom of the supplemental tank for closing the said opening, and means connected to the downwardly seating valve for unseating the same, the supplemental tank being adapted to rise the greater portion of its length above the main tank when the supplemental tank is raised.

In testimony that I claim the foregoing as my own, I have hereto affixed my signature in the presence of two witnesses.

ANDREW SANFORD HANGER.

Witnesses:
SAML. H. ARNALL,
W. M. SPRADLIN.